United States Patent [19]

Ishii

[11] Patent Number: 4,713,969

[45] Date of Patent: Dec. 22, 1987

[54] DIFFERENTIAL PRESSURE TRANSMISSION APPARATUS

[75] Inventor: Akira Ishii, Tokyo, Japan

[73] Assignee: Kabushiki Kaisha Toshiba, Kawasaki, Japan

[21] Appl. No.: 37,129

[22] Filed: Apr. 10, 1987

Related U.S. Application Data

[63] Continuation of Ser. No. 655,445, Sep. 28, 1984, abandoned.

[30] Foreign Application Priority Data

Sep. 30, 1983 [JP] Japan .................................. 58-182620
Sep. 30, 1983 [JP] Japan .................................. 58-182646

[51] Int. Cl.[4] .......................... G01L 13/02; G01L 13/06
[52] U.S. Cl. .......................................... 73/706; 73/707; 73/720
[58] Field of Search ................. 73/706, 707, 716, 717, 73/718, 719, 720, 721, 722

[56] References Cited

U.S. PATENT DOCUMENTS 3,400,588 9/1968 O'Connor ............................ 73/716
3,780,588 12/1973 Whitehead et al. ................. 73/721
4,527,428 7/1985 Shimada et al. ..................... 73/718
4,665,753 5/1987 Bertrand ............................. 73/706

OTHER PUBLICATIONS

Automation, vol. 19, No. 12, pp. 18–21, Saatu Denoki to Sono Genri-Henkankiko; Ichiro Kimura; 1974; Japan.

Primary Examiner—Donald O. Woodiel
Attorney, Agent, or Firm—Oblon, Fisher, Spivak, McClelland, & Maier

[57] ABSTRACT

A differential pressure transmitter has a body wherein a pressure transmission passage filled with a pressure transmission medium is formed. A differential-pressure/displacement converting element is disposed in the body to partition the passage into a high-pressure side section and a low-pressure side section. A first seal port through which the transmission medium is charged into the high-pressure side section and a second seal port through which the transmission medium is charged into the low-pressure side section are formed in the body. First and second throttle members capable of being taken out through the seal ports are disposed in the high- and low-pressure side sections to throttle the sections.

21 Claims, 8 Drawing Figures

FIG. 4
FIG. 5
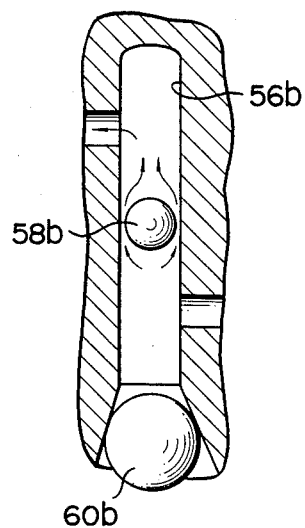
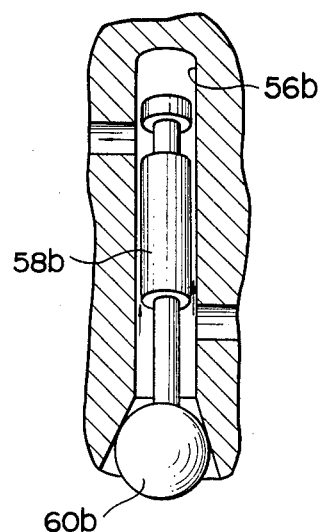
FIG. 6
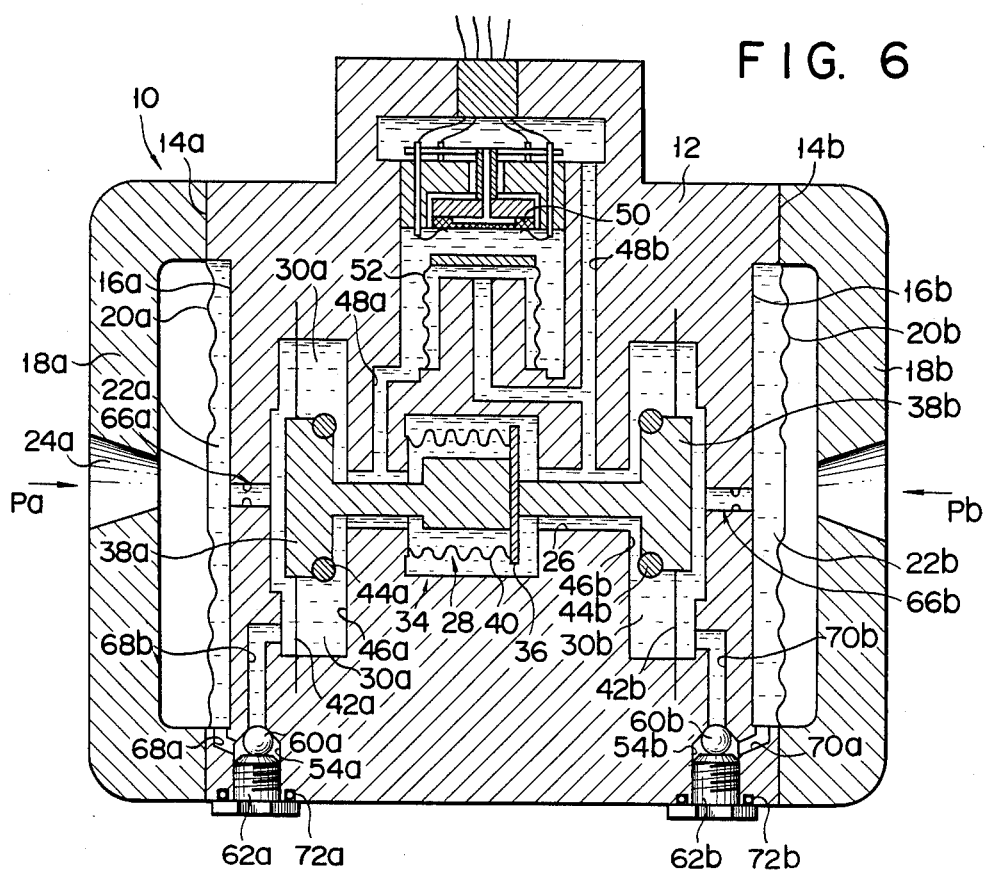

DIFFERENTIAL PRESSURE TRANSMISSION APPARATUS

This application is a continuation of application Ser. No. 655,445, filed on Sept. 28, 1984, now abandoned.

BACKGROUND OF THE INVENTION

1. Field of the Invention

This invention relates to differential pressure transmitters.

2. Discussion of the Background

The differential pressure transmitter generally has a body case in which a pressure transmission passage if formed. The pressure transmission passage has both ends open at the outer surface of the body case. One of the pressure transmission passage is closed by a high-pressure side, pressure-receiving diaphragm for receiving a pressure Pa to be detected, and the other end is closed by a low-pressure side, pressure-receiving diaphragm for receiving a pressure Pb to be detected. The pressure transmission passage is filled with a pressure transmission medium, e.g., silicone oil. Pressures applied to the pressure receiving diaphragms are transmitted to the pressure transmission medium. The body case also has a differential-pressure/displacement element, e.g., pressure-receiving diaphragm, which partitions the pressure transmission passage into a high-pressure side chamber and a low-pressure side chamber. This pressure-receiving diaphragm is displaced according to the pressure difference between the chambers. In the body case is further disposed a pressure-sensing element, which has a pressure-receiving surface for receiving the pressure in the high-pressure side chamber and a pressure-receiving surface for receiving the pressure in the low-pressure side chamber. The pressure-sensing element detects the difference between the pressures Pa and Pb and converts it into an electric signal.

When such a differential pressure transmitter is installed in a plant or the like, not only a static pressure but also pressures varying at various frequencies (hereinafter referred to as pulsating pressures) are applied to the high-pressure side and low-pressure side pressure-receiving diaphragms. The pulsating pressure is so great that it can not be ignored as compared to the differential pressure to be detected, and can cause variations in the output of the differential pressure transmitter even in an ordinary case. Therefore, it is necessary to remove the pulsating pressure. Among the known means for removing the pulsating pressure is one in which an electric filter is connected to the output terminal of the pressure-sensing element, and another in which a throttle is provided on the fluid side for removing the pulsating pressure by making use of the displacement of the volume of pressure transmission medium in correspondence to a change in the pressures applied to the differential pressure transmitter. The former means is simple, but in this case pulsating pressures are applied to the interior of the differential pressure transmission apparatus and also to the pressure-sensing element. For this reason, it is desirable from the standpoint of the life of the differential pressure transmitter to either use the latter means or the two means in combination.

As the pulsating pressure removing means with a throttle provided on the fluid side, there is one in which a throttle is provided in a pipe running from a process fluid line to the inlet of the differential pressure transmitter. In this case, however, depending on the kind of measurement fluid, clogging is possible and also the extent of the throttling and viscosity of the measurement fluid are influenced by the extent to which air bubbles in the pipe have been removed. Further, it has been the practice to provide the inner wall of the pressure transmission passage in a body case with a throttle section consisting of a protuberance. When filling the pressure transmission passage with the pressure transmission medium, the medium is charged into the passage in a vacuum and then the air is purged. Where a throttle section is provided in the pressure transmission passage, however, it is difficult to smoothly carry out the charging of the medium and air purging, and in some cases the performance of the differential pressure transmission apparatus is deteriorated by the remaining air bubbles. Further, there has been well-known a structure whose throttle is externally variable. In this case, however, the throttle is varied while maintaining the seal between the inside and outside of the body case. Therefore, the overall construction is complicated, leading to a high cost. In addition, reliability is reduced with the increase in seal sections.

SUMMARY OF THE INVENTION

In light of the above, an object of the current invention is to provide a differential pressure transmission apparatus which can sufficiently eliminate the pulsating pressure, and in which the charging of the the pressure transmission medium and air purging can be carried out smoothly at the time of filling the pressure transmission passage with the medium.

According to one aspect of the invention, there is provided a differential pressure transmission apparatus which has seal ports communicated with the pressure transmission passage for charging the pressure transmission medium and air purging, and in which throttle members capable of being taken out through the seal ports are provided within the pressure transmission passage.

With this construction, the pulsating pressure can be removed by the throttle members. Also, the charging of the pressure transmission medium into the pressure transmission passage and air purging can be carried out after the throttle members have been taken out from the pressure transmission passage. Thus, these operations can be carried out smoothly.

According to another aspect of the invention, there is provided a differential pressure transmission apparatus which includes throttle sections provided in the pressure transmission passage and seal ports for charging the pressure transmission medium therefrom. Each of the seal ports communicates with the pressure transmission passage on both sides of the corresponding throttle section.

With this construction, in which the seal ports are communicated with the pressure transmission passage on the opposite sides of the throttle sections, the charging of the pressure transmission medium into the pressure transmission passage and air purging can be carried out without the agency of the throttle sections, so that charging can be carried out smoothly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1 and 2 illustrate a differential pressure transmitter according to an embodiment of the invention, in which FIG. 1 is a sectional view of the transmitter and FIG. 2 is an enlarged-scale sectional view of a throttle member;

FIGS. 3 to 5 are sectional views with a perspective of different modifications of the throttle member; and FIGS. 6 to 8 are sectional views showing respectively second to fourth embodiments of the differential pressure transmitter according to the invention.

DETAILED DESCRIPTION OF THE PREFERRED EMBODIMENTS

Preferred embodiments of the invention will now be described with reference to the accompanying drawings.

Figure 1:
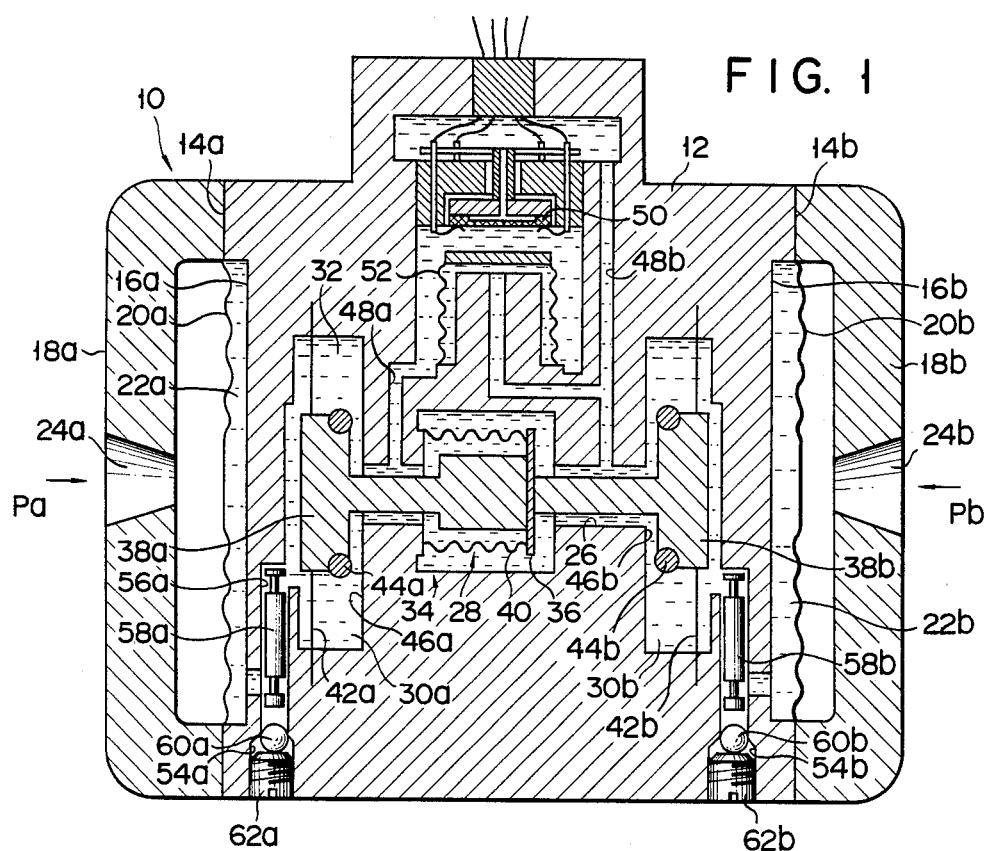

FIG. 1 illustrates a first embodiment of the differential pressure transmitter 10 according to the invention. The transmitter 10 comprises a body 12 with a pair of opposite side surfaces 14a and 14b. Recesses 16a and 16b are formed in the side surfaces 14a and 14b. Covers 18a and 18b are secured to the side surfaces 14a and 14b to cover the recesses 16a and 16b. The recess 16a is closed by a high-pressure side, pressure-receiving diaphragm 20a which is clamped between the side surface 14a of the body 12 and cover 18a and defines a first high-pressure side chamber 22a. The cover 18a has a high-pressure side pressure inlet 24a through which a pressure Pa to be detected is introduced. The recess 16b is closed by a low-pressure side, pressure-receiving diaphragm 20b which is clamped between the side surface 14b of the body 12 and over 18b, and which defines a first low-pressure side chamber 22b. The cover 18b has a low-pressure side pressure inlet 24b through which a pressure Pb to be detected is introduced.

The body 12 has a communication passage 26 which extends substantially at right angles to the pressure-receiving diaphragms 20a and 20b. The communication passage 26 communicates with the first high-pressure side chamber 22a and first low-pressure side chamber 22b. An overpressure prevention mechanism 28 is provided in the communication passage 26. It divides the communication passage 26 into a second high-pressure side chamber 30a communicating with the first high-pressure side chamber 22a and a second low-pressure side chamber 30b communicating with the first low-pressure side chamber 22b. The first and second high-pressure side chambers 22a and 30a, and the first and second low-pressure side chambers 22b and 30b are filled with a pressure transmission medium 32, e.g., silicone oil. These chambers constitute a pressure transmission passage 34 according to the invention.

The overpressure prevention mechanism 28 includes a high-pressure side valve 38a and a low-pressure side valve 38b, these valves 38a and 38b being secured to the opposite sides of a plate member 36. The mechanism 28 also includes an overpressure protection bellows 40 which connects the plate member 36 and body 12 and which divides the communication passage 26 into the chambers 30a and 30b. The valves 38a and 38b are supported by respective leaf springs 42a and 42b which are secured to the body 12. The valves 38a and 38b have respective O-rings 44a and 44b which are adapted to engage with the respective valve seats 46a and 46b which are formed on the body 12.

The pressure transmission passage 34 includes a high-pressure side communication passage 48a extending from the chamber 30a and a low-pressure side communication passage 48b extending from the chamber 30b and communicating with the high-pressure side communication passage 48a. A semiconductor pressure sensing element 50 is provided in the body 12 so that the communication passages 48a and 48b are separated by the sensing element. The pressure-sensing element 50 has a pressure-bearing surface to which the pressure in the high pressure side chamber 30a is applied via the communication passage 48a, and a pressure-bearing surface to which the pressure in the low pressure side chamber 30b is applied via the communication passage 48b. The element 50 detects the difference between the two pressures and converts the detected pressure difference into an electric signal to be supplied to an external circuit. A compliance bellows 52 is further provided in the body 12 between the high-pressure side communication passage 48a and the low-pressure side communication passage 48b. The bellows 52 serves to absorb the variations of the internal pressure in the pressure transmission passage 34 when the overpressure protection bellows 40 is held in an immovable state.

The body 12 has a high-pressure side seal port 54a and a low-pressure side seal port 54b. The filling of the high-pressure side chambers 22a and 30a and of the communication passage 48a with the pressure transmission medium 32, and the air purging are made through the high-pressure side seal port 54a. The filling of the low-pressure side chambers 22b and 30b and of the communication passage 48b with the pressure transmission medium 32, and the air purging are made through the low-pressure side seal port 54b. The high-pressure side seal port 54a communicates with, for instance, the second high-pressure side chamber 30a. A portion of the chamber 30a adjacent to the seal port 54a constitutes an accommodating section 56a. The section 56a has a vertically extending cylindrical shape, and it accommodates a first throttle member 58a which provides throttling of the accommodating section and hence the high-pressure side of the pressure transmission passage 28. The throttle member 58a can be inserted into and taken out of the accommodating section 56a through the seal port 54a. The seal port 54a is sealed by a seal member 60a, e.g., a ball. The seal member 60a is in turn retained in position by a seal member retainer 62a which is externally screwed into the seal port 54a.

The low-pressure side seal port 54b communicates with, for instance, the second low-pressure side chamber 39b. Like the high-pressure side, a portion of the second low-pressure side chamber 30b adjacent to the seal port 54b consitutes a vertically extending cylindrical accommodating section 56a in which is accommodated a second throttle member 58b providing throttling on the low pressure side of the pressure transmission passage 34. A seal member 60b and seal member retainer 62b are provided in the seaal port 54b.

Figure 2:
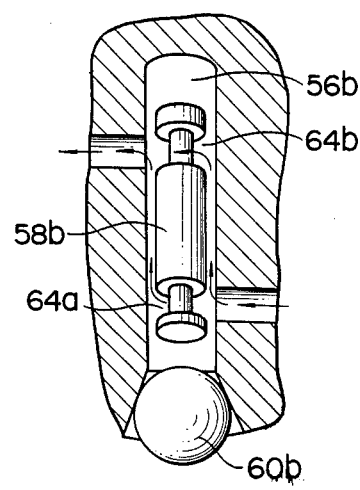

The first and second throttle members 58a and 58b have the same shape. The second throttle member 58b is typically shown in FIG. 2. As is shown, it is cylindrical in shape with a diameter slightly smaller than the diameter of the accommodating section 56b. It has annular grooves 64a and 64b formed near its opposite ends. When pressure is applied to the pressure-bearing diaphragm 20b, the pressure transmission medium 32 is forced from the first low pressure side chamber 22b into the accommodating section 56b and thence is forced through the annular groove 64a in the throttle member 58a, the space between the throttle member and inner wall of the accommodating section, and through the annular groove 64b to the overpressure protection mechanism 28. The throttle members 58a and 58b may be either hollow or solid. Hollow throttle members will have reduced weight and increased buoyancy, so that they can be moved in axial directions according to pressure variations. Thus, the response to pressure variations in a low frequency range will be improved.

The pressure transmission passage 34 is filled with the pressure transmission medium 32 in the following way. First, the seal member retainers 62a and 62b, and seal members 60a and 60b are removed from the seal ports 54a and 54b, and then the throttle members 58a and 58b are taken out from the accommodating sections 56a and 56b through the seal ports. Then, the pressure transmission passage 34 is filled with the pressure transmission medium 32 by charging the medium from the seal ports 54a and 54b. Since the throttle members 58a and 58b have been removed, the pressure transmission passage 34 offers less throttling resistance, so that the filling with the pressure transmission medium and air purging can be done smoothly. After the filling with the pressure transmission medium and air purging have been completed, the throttle members 58a and 58b are inserted again into the accommodating sections 56a and 56b through the seal ports 54a and 54b. Thereafter, the seal ports 54a and 54b are sealed with the seal members 60a and 60b and seal member retainers 62a and 62b.

The operation of the differential pressure transmitter having the above construction will now be described.

Assume now that the pressure-receiving diaphragms 20a and 20b are simultaneously acted on by the high-pressure side pressure Pa and low-pressure side pressure Pb led through the pressure inlets 24a and 24b, respectively. The high-pressure side pressure Pa is transmitted through the high-pressure side chambers 22a and 30a to the bellows 40, and is also transmitted through the high-pressure side communication passage 48a to the one pressure-receiving surface of the pressure-sensing element 50. Likewise, the low-pressure side pressure Pb is transmitted to the bellows 40 and also to the other pressure-receiving surface of the pressure-sensing element 50. As a result, the bellow 40 and pressure sensing element 50 are displaced to the low-pressure side according to the pressure difference Pa—Pb. The pressure-sensing element 50 senses the pressure difference and provides a signal corresponding to the pressure difference.

When the pressures Pa and Pb are pulsating pressure, their variations are attenuated by the throttled portions of the pressure transmission passage 34 throttled by the throttle members 58a and 58b, i.e., the accommodating sections 56a and 56b, so that substantially constant pressures are transmitted to the bellows 40 and pressure-sensing element 50. If the throttle members 58a and 58b are capable of being displaced according to pressure variations, pressure variations even in a low frequency range can be attenuated as mentioned earlier.

Assume now that the press Pa applied to the high-pressure side of the differential pressure transmission apparatus 10 exceeds a detectable range. In this case, the overpressure protection bellows 40 extends, causing the valves 38a and 38b to be moved to the right. Consequently, the O-ring 44a of the high-pressure side valve 38a is eventually brought into contact with the valve seat 46a of the body 12. Thus, on the high-pressure side of the pressure transmission passage 34, the pressure transmission medium 32 is separated into the portion that is found between the pressure-receiving diaphragm 20a and O-ring 44a, and the portion that is found between the O-ring 44a and pressure-sensing element 50. The latter portion of the pressure transmission medium is thus sealed or confined, so that the further pressure which may be applied to the pressure-receiving diaphragm 20a is not transmitted to it. The pressure-sensing element 50 is held under pressure immediately before the O-ring 44a is brought into contact with the valve seat 46a. The internal pressure absorption bellows 52 absorbs the increase of pressure generated in the confined portion of the pressure transmission medium when the overpressure protection bellows 40 is displaced until it is perfectly extended after the instant of engagement of the O-ring 44a with the valve seat 46a. In the case where overpressure is applied to the low pressure side of the differential pressure transmission apparatus 10, the overpressure protection mechanism 28 and compliance bellows 52 behave conversely. The pressure-sensing element 50 is thus protected by the overpressure protection mechanism 28 and compliance bellows 52 so that a differential pressure in excess of the detectable range is not applied to it.

The differential pressure transmission apparatus 10 of the above construction has the following advantages.

(1) The pressure transmission medium can be charged into the pressure transmission passage while the throttle members are not inserted in the pressure transmission passage. Thus, the filling of the pressure transmission medium and air purging can be carried out smoothly, and there is no possiblity of the deterioration of the performance of the apparatus due to the remaining air bubbles.

(2) The degree of throttling can be freely varied by varying the shape and dimensions of the throttle member, and the machining of the body can be done irrespective fo the extent of throttling.

(3) The seal ports are sealed with the seal members after the throttle members have been inserted. Thus, there is no possiblity of spoiling the seal with the insertion of the throttle members.

(4) Even if the volume, shape, etc. of the pressure transmission passage varies between the high-pressure side and low-pressure side, the throttling resistance on the high-pressure side and that on the low-pressure side in the pressure transmission passage can be equalized by appropriately adjusting the shape, dimensions, etc. of the pair of throttle members. Thus, it is possible to prevent the generation of a differential pressure due to variations of a line pressure which is simultaneously applied to the high-pressure side and low-pressure side of the differential pressure transmission apparatus.

(5) By the throttle members, the overpressure bellows, compliance bellows, and pressure-sensing element can be protected from pulsating pressures.

Figure 3:
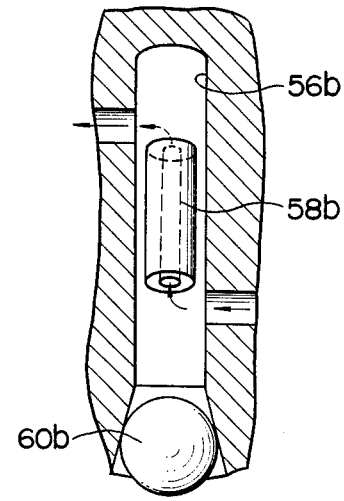

The present invention is not limited to the above embodiment, and various changes and modifications are possible. For example, while in the above embodiment the seal ports 54a and 54b communciate with the respective chambers 30a and 30b, they may communicate with the communication passages 48a and 48b as well. In this case, the accommodating sections for accommodating the throttle members are formed in the communication passages. The throttle member may have a hollow cylindrical shape as shown in FIG. 3 or a spherical shape as shown in FIG. 4. In general, it may have any desired shape so long as it can provide throttling to the pressure transmission passage. Further, it may be integral with the seal member as shown in FIG. 5.

FIG. 6 shows a second embodiment of the invention. In this embodiment, in lieu of providing throttle members, first and second throttle sections 66a and 66b are formed on the high-pressure side and low-pressure side of the pressure transmission passage 34. The first throttle section 66a consists of protuberances formed on the inner wall of the pressure transmission passage 34 between the pressure-bearing diaphragm 20a and high pressure side valve 38a. The second throttle section 66b consists of protuberances formed on the inner wall of the pressure transmission passage 34 between the pressure-bearing diaphragm 20b and low-pressure side valve 38b.

The seal port 54a communicates with the first and second high pressure side chambers 22a and 30a through respective first filling passages 68a and 68b. In other words, the seal port 54a communicates with the pressure transmission passage 34 on both sides of the throttle section 66a. The low-pressure side port 54b communicates with the first and second low-pressure side chambers 22b and 30b through respective second filling passages 70a and 70b. Also, the seal port 54b communicates with the pressure transmission passage 34 on both sides of the throttle section 66b. The seal port 54a and 54b are sealed by the seal members 60a and 60b, and by seal member retainers 62a and 62b. O-rings 72a and 72b are provided between the body 12 and seal member retainers 62a and 62b, enhancing the liquid-tight seal of the seal ports 54a and 54b.

The rest of the contruction is the same as in the preceding first embodiment, and like parts are designated by like reference numerals and are not described.

The filling the pressure transmission passage 34 in this embodiment with the pressure transmission medium 32, the medium is charged from the seal ports 54a and 54b through the first and second filling passage 68a and 68b, and 70a and 70b into the pressure transmission passage. Since each seal port communicates with the pressure transmission passage 34 on both sides of the throttle section, the medium can be charged into the transmission passage without passing through the throttle sections 66a and 66b. That is the throttling resistance is low, and the filling with the pressure transmission medium and air purging can be carried out smoothly. In addition, the same effects as in the first embodiment can also be obtained.

Although in the second embodiment the throttle sections 66a and 66b are provided in the pressure transmission passage 34, they may be provided in the high-pressure side communication passage 48a and low-pressure side communication passage 48b as well. In this case, each of the seal ports 54a and 54b must communicate with the pressure transmission passages on both sides of the corresponding throttle sections.

Figure 7:
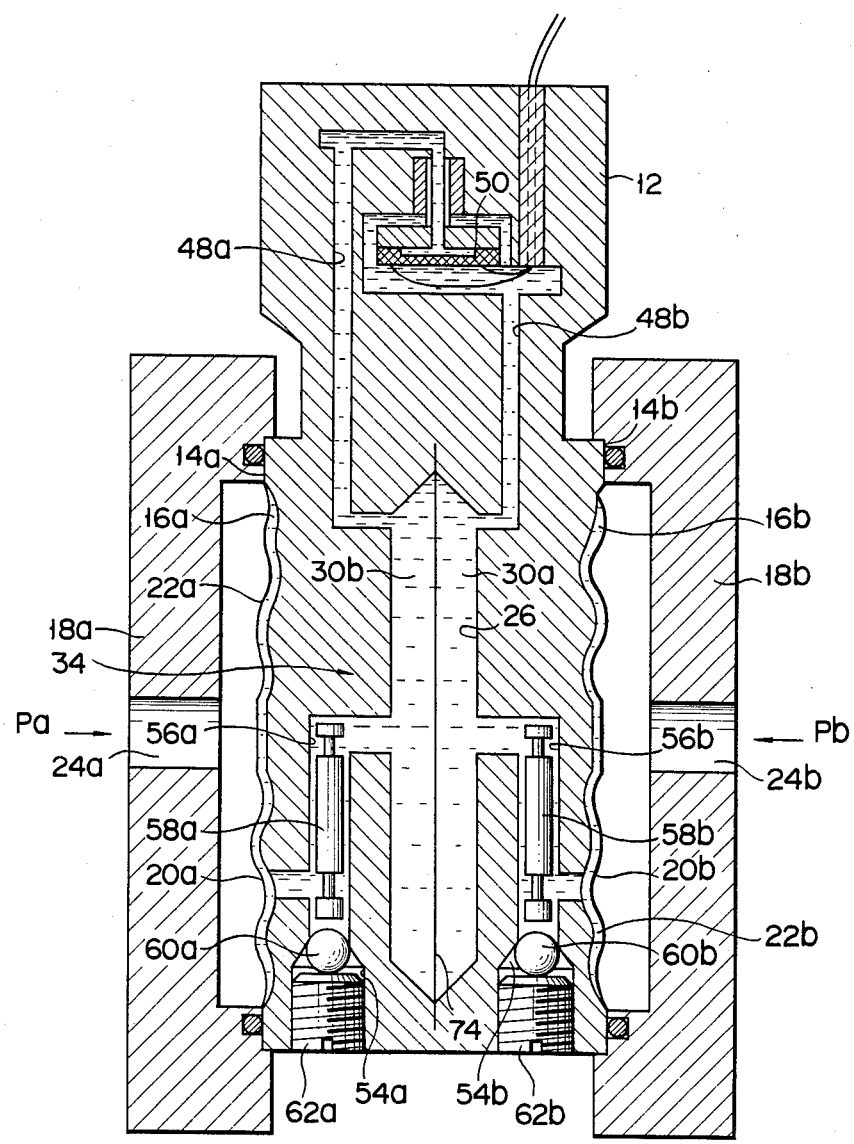
Figure 8:
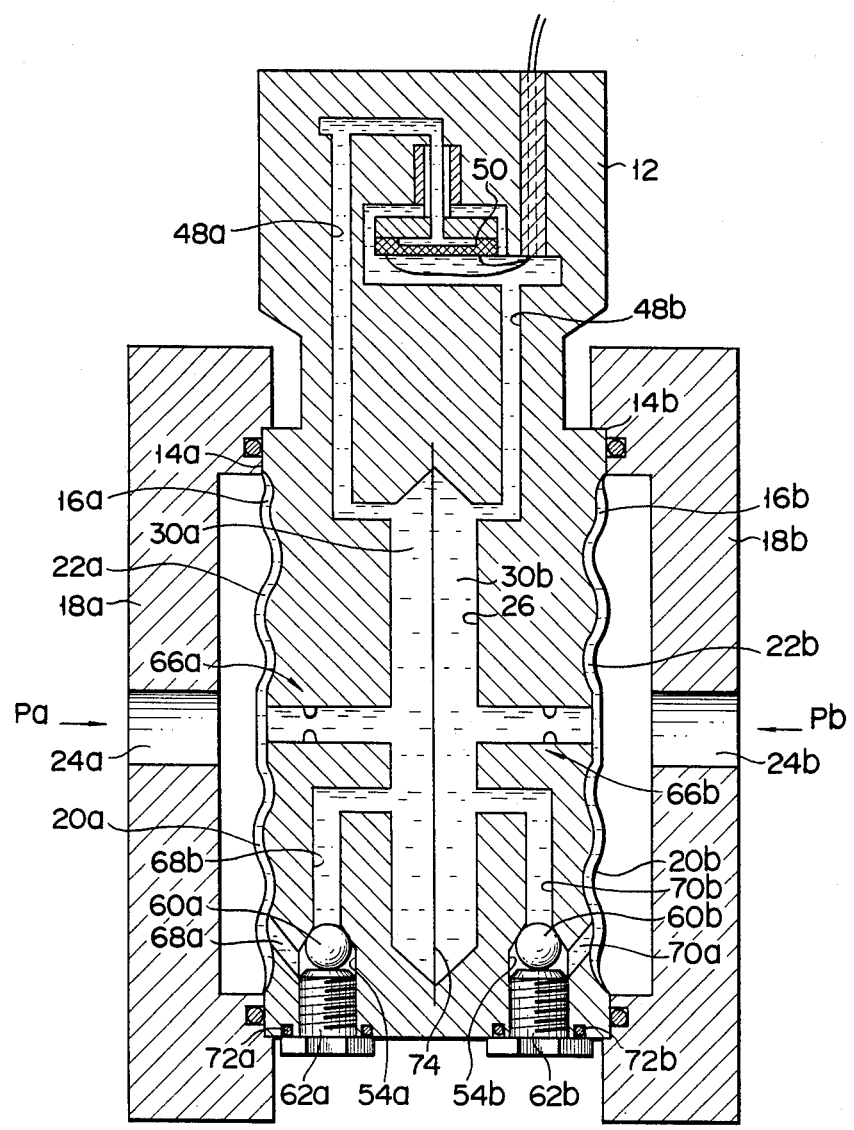

FIGS. 7 and 8 show further embodiments of the differential pressure transmission apparatus according to the invention.

These differential pressure transmission apparatuses differ from the first embodiment of the apparatus shown in FIG. 1 in that an intermediate diaphragm 74 is provided in stead of the overpressure protection mechanism 28 and that the bottoms of the recesses 16a and 16b are formed as seats for the respective pressure receiving diaphragms 20a and 20b. The rest of the construction is substantially the same as in the differential pressure transmission apparatus shown in FIG. 1, and like parts are designated by like reference numerals and so are not described.

In the embodiment of FIG. 7, throttle members 58a and 58b are disposed in the high-pressure side and low-pressure side of the pressure transmission passage 34. These throttle members can be inserted and taken out through the seat ports 54a and 54b. With this embodiment, the same advantages as in the embodiment of FIG. 1 can be obtained.

In the embodiment of FIG. 8, throttle sections 66a and 66b are provided on the high-pressure side and low-pressure side of the pressure transmission passage 34. Each of the seal ports 54a and 54b communicates with the pressure transmission passage on both sides of the corresponding throttle section. With this embodiment, the same effects as in the second embodiment of FIG. 6 can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A differential pressure transmission apparatus comprising:

a body having therein a pressure transmission passage filled with a pressure transmission medium, said pressure transmission passage having a high-pressure side end and a low-pressure side end, these ends being open at the outer surface of the body;

a high-pressure side pressure-receiving diaphragm, mounted on the body and closing the high-pressure side end of the pressure transmission passage, for receiving a high-pressure side pressure and for transmitting the pressure to the medium;

a low-pressure side pressure-receiving diaphragm, mounted on the body and closing the low-pressure side end of the pressure transmission passage, for receiving a low-pressure side pressure and for transmitting the pressure to the medium;

differential-pressure/displacement converting means disposed in the body, partitioning the pressure transmission passage into a high-pressure side section and a low-pressure side section, and being displaceable according to pressure differences between these sections;

a pressure-sensing element for detecting pressure differences between the pressure in the high-pressure side section and the pressure in the low-pressure side section;

first throttle means, disposed in the high-pressure side section, for attenuating pressure variations transmitted from the high-pressure side pressure-receiving diaphragm, said first throttle means establishing a first throttling cross-sectional area disposed between a first portion of the high-pressure side section adjacent the high-pressure side pressure-receiving diaphragm and a remaining portion of the high-pressure side section;

second throttle means, disposed in the low-pressure side section, for attenuating pressure variations transmitted from the low-pressure side pressure-receiving diaphragm, said second throttle means establishing a second throttling cross-sectional area disposed between a first portion of the low-pressure side section adjacent the low-pressure side pressure-receiving diaphragm and a remaining portion of the low-pressure side section;

first and second medium seal ports formed in the body;

first filling means for filling the high-pressure side section with the medium, the first filling means comprising means for establishing first filling flow paths having respective minimum cross-sectional areas that are greater than the first throttling cross-sectional area and that respectively communicate the first and remaining portions of the high-pressure side section with the first medium seal port; and second filling means for filling the low-pressure side section with the medium, the second filling means comprising means for establishing second filling flow paths having respective minimum cross-sectional areas that are greater than the second throttling cross-sectional area and that respectively communicate the first and remaining portions of the low-pressure side section with the second medium seal port.

2. A differential pressure transmission apparatus comprising:

a body having therein a pressure transmission passage filled with a pressure transmission medium, said pressure transmission passage having a high-pressure side end and a low-pressure side end, these ends being open at the outer surface of the body;

a high-pressure side, pressure-receiving diaphragm mounted on the body to close the high-pressure side end of the pressure transmission passage, for receiving a high-pressure side pressure and transmitting the pressure to the pressure transmission medium;

a low-pressure side, pressure receiving diaphragm mounted on the body to close the low-pressure side end of the pressure transmission passage, for receiving a low-pressure side pressure and transmitting the pressure to the pressure transmission medium;

differential-pressure/displacement converting means arranged in the body such as to partition the pressure transmission passage into a high-pressure side section adjacent to the high-pressure side, pressure-receiving diaphragm and a low-pressure side section adjacent to the low-pressure side, pressure-receiving diaphragm, for being displaced according to the pressure difference between these sections;

a pressure-sensing element for detecting the difference between the pressure in the high-pressure side section and the pressure in the low-pressure side section;

a first medium seal port formed in the body and communicating with the high-pressure side section;

a second medium seal port formed in the body and commmunicating with the low-pressure side section;

a first throttle member disposed in the high pressure side section to be removable therefrom through the first medium seal port, for throttling the high-pressure side section to attenuate pressure variations transmitted from the high-pressure side, pressure-receiving diaphragm;

a second throttle member disposed in the low-pressure side section to be removable therefrom through the second medium seal port, for throttling the low-pressure side section to attenuate pressure variations transmitted from the low-pressure side, pressure-receiving diaphragm; and seal means for sealing the first and second medium seal ports.

3. The differential pressure transmission apparatus according to claim 2, wherein said high-pressure side section includes a first accommodating section for accommodating the first throttle member, said first throttle member is movably accommodated in the first accommodating section, said low-pressure side section includes a second accommodating section for accommodating the second throttle member, and said second throttle member is movably accommodated in the second accommodating section.

4. The differential pressure transmission apparatus according to claim 3, wherein said first and second throttle members are cylindrical in shape.

5. The differential pressure transmission apparatus according to claim 3, wherein said first and second throttle members are spherical in shape.

6. The differential pressure transmission apparatus according to claim 3, wherein said first and second throttle members are hollow.

7. The differential pressure transmission apparatus according to claim 2, wherein said seal means includes a first seal member for sealing the first seal port and a second seal member for sealing the second seal port, said first throttle member being integral with the first seal member, and said second seal member being integral with the second seal member.

8. The differential pressure transmission apparatus according to claim 2, wherein said high-pressure side section includes a high-pressure side chamber adjacent to the high-pressure side, pressure-receiving diaphragm and a high-pressure side communication passage extending from the high-pressure side chamber, said low-pressure side section includes a low-pressure side chamber adjacent to the low-pressure side diaphragm and a low-pressure side communication passage extending from the low-pressure side chamber and communicating with the high-pressure side communicating passage, and said high- and low-pressure side communication passages are separated from each other by the pressure-sensing element.

9. The differential pressure transmission apparatus according to claim 8, wherein said first seal port communicates with the high-pressure side chamber, and said second seal port communicates with the low-pressure side chamber.

10. The differential pressure transmission apparatus according to claim 2, wherein said differential-pressure/displacement converting means includes a diaphragm partitioning the pressure transmission passage.

11. The differential pressure transmission apparatus according to claim 2, wherein said differential-pressure/displacement converting means includes a bellows for partitioning the pressure transmission passage and an overpressure protection mechanism disposed in the pressure transmission passage and coupled to the bellows, for preventing the transmission of a differential pressure in excess of a predetermined level to the pressure sensing element.

12. A differential pressure transmission apparatus comprising:

a body having therein a pressure transmission passage filled with a pressure transmission medium, said pressure transmission passage having a high-pressure side end and a low-pressure side end, said ends being open at the outer surface of the body;

a high-pressure side pressure-receiving diaphragam mounted on the body to close the high pressure side of the pressure transmission passage, for receiving a high-pressure side pressure and transmitting the pressure to the pressure transmission medium;

a low-pressure side pressure-receiving diaphragm mounted on the body to close the low-pressure side end of the pressure transmission passage, for receiving a low-pressure side pressure and transmitting the pressure to the pressure transmission medium;

differential-pressure/displacement converting means disposed in the body such as to partition the pressure transmission passage into a high-pressure side section adjacent to the high-pressure side, pressure-receiving diaphragm and a low-pressure side section adjacent to said low-pressure side, pressure-receiving diaphragm, for being displaced according to the pressure difference between these sections;

a pressure-sensing element for detecting the difference between the pressure in the high-pressure side section and the pressure in the low-pressure side section;

a first throttle section formed in the high-pressure side section, for attenuating pressure variations transmitted from the high-pressure side diaphragm;

a second throttle section formed in the low-pressure side section, for attenuating pressure variations transmitted from the low-pressure side diaphragm;

a first medium seal port formed in the body and communicating with the high-pressure side section on both sides of the first throttle section;

a second medium seal port formed in the body and communicating with the low-pressure side section on both sides of the second throttle section; and seal means for sealing the first and second seal ports.

13. The differential pressure transmission apparatus according to claim 12, wherein said high-pressure side section includes a first high-pressure chamber adjacent to the high-pressure side, pressure-receiving diaphragm, a second high-pressure side chamber communicating with the first high-pressure side chamber and adjacent to the differential-pressure/displacement converting means, and a high-pressure side communication passage extending from the second high-pressure side chamber; said low-pressure side section includes a first low-pressure side chamber adjacent to the low-pressure side, pressure-receiving diaphragm, a second low-pressure side chamber communicating with the first low-pressure side chamber and adjacent to the differential-pressure/displacement converting means, and a low-pressure side communication passage extending from the second low-pressure side chamber and communicating with the high-pressure side communication passage; and said pressure-sensing element is disposed to partition the high-pressure side and low-pressure side communication passages into high-pressure side portions and low-pressure side portions.

14. The differential pressure transmission apparatus according to claim 13, wherein said first throttle section is provided between the first and second high-pressure side chambers, and said second throttle section is provided between the first and second low-pressure side sections.

15. The differential pressure transmission apparatus according to claim 14, wherein said first seal port communicates with the first and second high-pressure side chambers, and said second seal port communicates with the first and second low-pressure side chambers.

16. The differential pressure transmission apparatus according to claim 12, wherein said first and second throttle sections have protuberances formed on the inner wall of the pressure transmission passage.

17. The differential pressure transmission apparatus according to claim 12, wherein said differential-pressure/displacement converting means includes a diaphragm partitioning the pressure transmission passage.

18. The differential pressure transmission apparatus according to claim 12, wherein said differential-pressure/displacement converting means includes a bellows partitioning the pressure transmission passage, and an overpressure protection mechanism disposed in the pressure transmission passage and coupled to the bellows, for preventing a differential pressure in excess of a predetermined level from being transmitted to the pressure-sensing element.

19. A differential pressure transmission apparatus comprising:

a body having therein a pressure transmission passage filled with a pressure transmission medium, said pressure transmission passage having a high-pressure side end and a low-pressure side end, said ends being open at the outer surface of the body;

a high-pressure side pressure-receiving diaphragm mounted on the body to close the high-pressure side of the pressure transmission passage, for receiving a high pressure side pressure and for transmitting the pressure to the pressure transmission medium;

a low-pressure side pressure-receiving diaphragm, mounted on the body to close the low-pressure side end of the pressure transmission passage, for receiving a low-pressure side pressure and for transmitting the pressure to the pressure transmission medium;

differential-pressure/displacement converting means disposed in the body, partitioning the pressure transmission passage into a high-pressure side section and a low-pressure side section, and being displaceable according to pressure differences between these sections;

a pressure-sensing element for detecting pressure differences between the pressure in the high-pressure side section and the pressure in the low-pressure side section;

first throttle means, disposed in the high-pressure side section, for attenuating pressure variations transmitted from the high-pressure side pressure-receiving diaphragm, said first throttle means establishing a first throttling area disposed between a first portion of the high-pressure side section adjacent the high-pressure side pressure-receiving diaphragm and a remaining portion of the high-pressure side section;

second throttle means, disposed in the low-pressure side section for attenuating pressure variations transmitted from the low-pressure side pressure-receiving diaphragm, said second throttle means establishing a second throttling area disposed between a first portion of the low-pressure side section adjacent the low-pressure side pressure-receiving diaphragm and a remaining portion of the low-pressure side section;

first and second medium seal ports formed in the body;

first filling means for filling the high-pressure side section with the medium, the first filling means comprising a first filling flow path communicating the first and remaining portions of the high-pressure side section with the first medium seal port;

second filling means for filling the low-pressure side section with the medium, the second filling means comprising a second filling flow path communicating the first and remaining portions of the low-pressure side section with the second medium seal port;

first seal means disposed in the first filling flow path and being removable through the first seal port, for sealing the first seal port and preventing the medium from flowing through the first filling flow path after the high-pressure side section is filled with the medium; and second seal means disposed in the second filling flow path and being removable through the second seal port, for sealing the second seal port and preventing the medium from flowing through the second filling flow path after the low-pressure side section is filled with the medium.

20. The differential pressure transmission apparatus according to claim 19, wherein said first and second throttle means are symmetrically arranged with respect to the differential-pressure/displacement converting means.

21. A differential pressure transmission apparatus comprising:

a body having therein a pressure transmission passage filled with a pressure transmission medium, said pressure transmission passage having a high-pressure side end and a low-pressure side end, these ends being open at the outer surface of the body;

a high-pressure side pressure-receiving diaphragm, mounted on the body and closing the high-pressure side end of the pressure transmission passage, for receiving a high-pressure side pressure and for transmitting the pressure to the medium;

a low-pressure side pressure-receiving diaphragm, mounted on the body and closing the low-pressure side end of the pressure transmission passage, for receiving a low-pressure side pressure and for transmitting the pressure to the medium;

differential-pressure/displacement converting means disposed in the body, partitioning the pressure transmission passage into a high-pressure side section and a low-pressure side section, and being displaceable according to pressure differences between these sections;

a pressure-sensing element for detecting pressure differences between the pressure in the high-pressure side section and the pressure in the low-pressure side section;

first passage means disposed in the high-pressure side section communicating a first portion of the high-pressure side section adjacent the high-pressure side pressure-receiving diaphragm and a remaining portion of the high-pressure side section, said first passage means being the only means establishing fluid communication between said first and remaining portions of the high-pressure side section during operation of said apparatus, there being first throttle means disposed in said first passage means for restricting the total fluid communication between said first and remaining portions of the high-pressure side section to a magnitude that is effective to attenuate pressure variations transmitted from the high-pressure side pressure-receiving diaphragm;

second passage means disposed in the low-pressure side section communicating a first portion of the low-pressure side section adjacent the low-pressure side pressure-receiving diaphragm and a remaining portion of the low-pressure side section, said second passage means being the only means establishing fluid communication between said first and remaining portions of the low-pressure side section during operation of said apparatus, there being second throttle means disposed in said second passage means for restricting the total fluid communication between said first and remaining portions of the low-pressure side section to a magnitude that is effective to attenuate pressure variations transmitted from the low-pressure side pressure-receiving diaphragm, said second throttle means presenting a throttling resistance that is substantially equal to the throttling resistance presented by said first throttle means;

first and second medium seal ports formed in the body;

first filling means for filling the high-pressure side section with the medium, said first filling means comprising first high-pressure side filling passage means for directly communicating said first portion of the high-pressure side section with the first medium seal port during said filling and second high-pressure side filling passage means for directly communicating said remaining portion of the high-pressure side section with said first medium seal port during said filling; and second filling means for filling the low-pressure side section with the medium, said second filling means comprising first low-pressure side filling passage means for directly communicating said first portion of the low-pressure side section with said second medium seal port during said filling and second low-pressure side filling passage means for directly communicating said remaining portion of the low-pressure side section with said second medium seal port during said filling.

* * * * *